United States Patent

Tanaka et al.

[11] Patent Number: 5,079,429
[45] Date of Patent: Jan. 7, 1992

[54] OPTICAL CHARACTERISTIC ADJUSTING APPARATUS

[75] Inventors: Satoru Tanaka; Yasushi Murata; Fumio Matsui, all of Saitama, Japan

[73] Assignee: Pioneer Electronic Corporation, Tokyo, Japan

[21] Appl. No.: 683,590

[22] Filed: Apr. 11, 1991

Related U.S. Application Data

[63] Continuation of Ser. No. 470,506, Jan. 26, 1990, abandoned.

[30] Foreign Application Priority Data

Jun. 6, 1989 [JP] Japan ................... 1-143385

[51] Int. Cl.$^5$ ............................................. G01J 5/00
[52] U.S. Cl. .................................................. 250/461.1
[58] Field of Search ...................................... 250/461.1

[56] References Cited

U.S. PATENT DOCUMENTS 3,123,711 3/1964 Fajans ................. 250/461.1
4,916,319 4/1990 Telfair et al. ............ 250/461.1

FOREIGN PATENT DOCUMENTS 2613845 10/1988 France ................. 250/461.1
63-191884 8/1988 Japan .
1-129062 5/1989 Japan .

Primary Examiner—Constantine Hannaher
Attorney, Agent, or Firm—Sughrue, Mion, Zinn, Macpeak & Seas

[57] ABSTRACT

An optical characteristic adjusting apparatus for a laser beam radiation system comprises a transparent substrate which generates visible radiation in response to non-visible radiation, and a stand for positioning the substrate perpendicular to an optical axis of laser beam emitted from a laser beam radiation system. When the non-visible radiation irradiates the surface of the substrate, a bright spot is formed since the visible radiation is generated from the irradiated portion of the substrate. Therefore, an operator can appropriately adjust the optical characteristics of the non-visible radiation at both sides of the transparent substrate since the bright spot can be observed at both sides of the transparent substrate.

8 Claims, 1 Drawing Sheet

OPTICAL CHARACTERISTIC ADJUSTING APPARATUS

BACKGROUND OF THE INVENTION

This invention relates to an apparatus for adjusting optical characteristics of non-visible radiation such as ultraviolet laser beam which is emitted from a laser beam radiation system, and more specifically, to an optical characteristic adjusting apparatus to be used for correcting a deviation of an optical axis and adjusting a focal distance or the like.

In order to perform an adjustment of a laser beam radiating system which irradiates ultraviolet laser beam, it is necessary that an optical axis and a focal spot of the ultraviolet laser beam are recognized by scanning a screen which is sensitive with the ultraviolet laser beam.

Since there has been no special tool to recognize the above-mentioned characteristics, paper or the like is used, which is mixed with fluorescent material generating visible radiation in response to irradiation or projection of the ultraviolet laser beam. In other words, if the ultraviolet laser beam projects the surface of the paper, visible radiation is effected from the projected portion. The operator may adjust both the laser beam irradiation system and the adjusting apparatus through the observation of the visible radiation by his own eyes.

However, since the visible radiation is generated from only the projected surface of the paper, the-above noted apparatus must be disposed within a space in which the operator can operate the apparatus and can actually watch the irradiated portion on only one side of the paper. This causes a drawback of narrowing the operating space.

SUMMARY OF THE INVENTION

In order to overcome the above-noted problems, it is an object of the present invention to provide an optical characteristic adjusting apparatus in which an optical axis of non-visible radiation can be visibly recognized with ease and an operating space of an operator can be broader.

An optical characteristic adjusting apparatus for a laser beam radiation system according to the present invention is characterized in that the apparatus comprises a transparent substrate including therein luminescent material generating visible radiation in response to un-visible radiation, and positioning means which is used for positioning the transparent substrate perpendicular to an optical axis of laser beam emitted from the laser beam radiation system.

DETAIL DESCRIPTION OF THE PREFERRED EMBODIMENTS

An optical characteristic adjusting apparatus for a laser radiation system according to an embodiment of the present invention will now be described hereinafter in detail with reference to the accompanied drawing.

Figure 1:
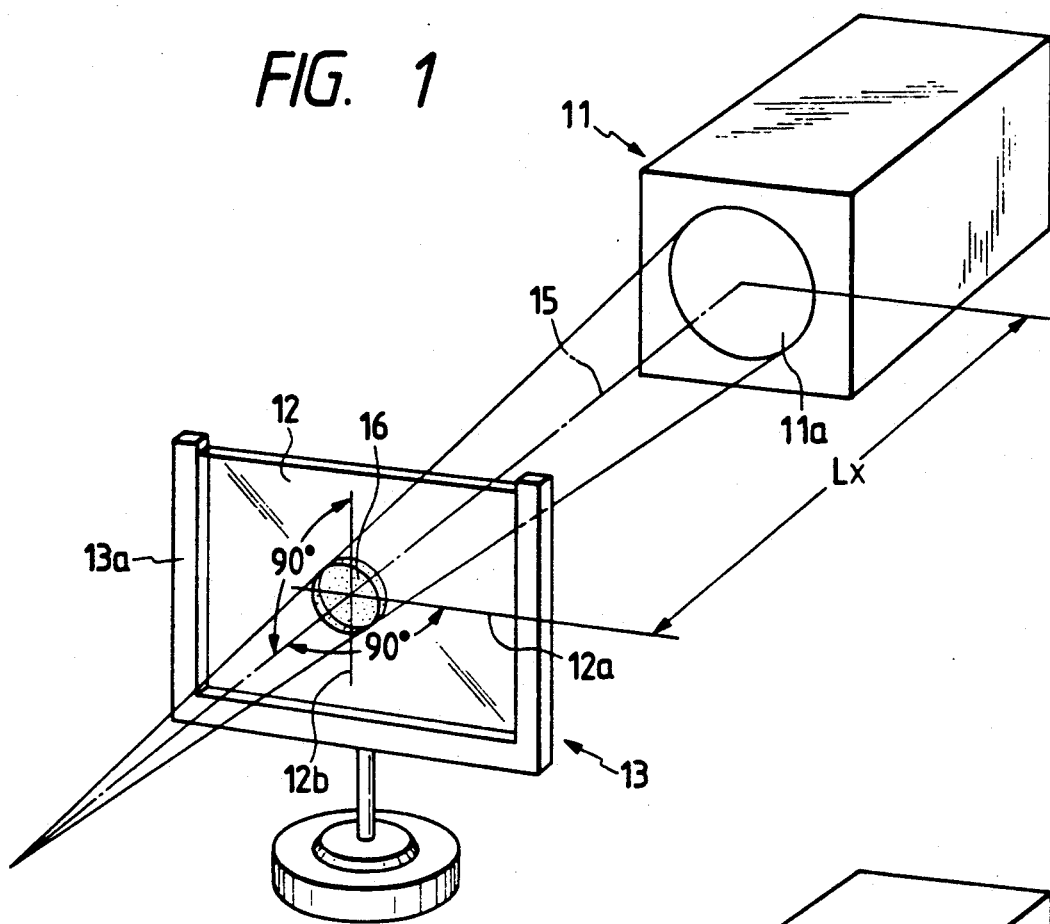
FIG. 1 is a perspective view showing a major part of an optical characteristic adjusting apparatus for a laser beam radiation system according to an embodiment of the present invention.
Figure 2:
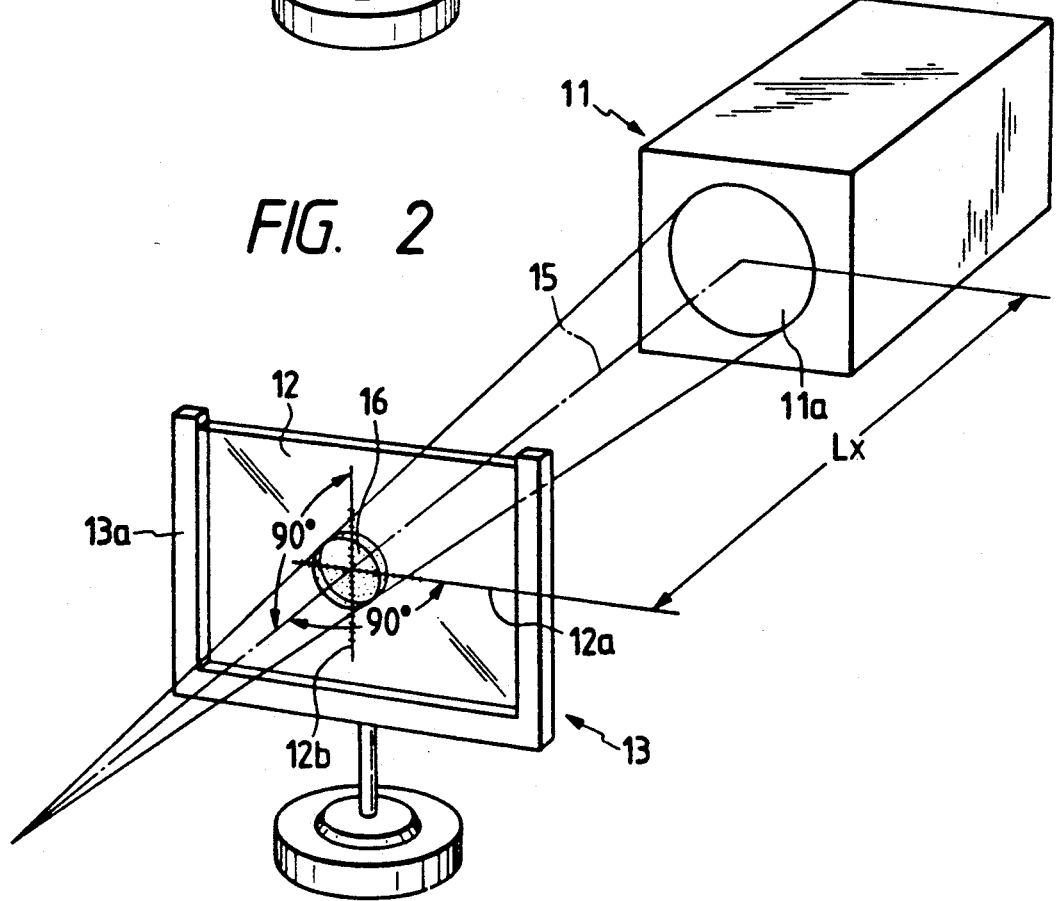
FIG. 2 is a perspective view showing a major part of an optical characteristic adjusting apparatus for a laser beam radiation system according to another embodiment of the present invention.

As shown in FIG. 1, the optical characteristic adjusting apparatus comprises a rectangular substrate 12 irradiated by ultraviolet laser beam which is emitted from a laser beam radiation system 11 and a stand 13 including a frame member 13a for holding the substrate 12. The substrate 12 is mixedly formed of transparent resin and luminescent material which generates the visible radiation in response to the ultraviolet laser beam. Therefore, the substrate 12 as a whole may keep appropriate transparency if the ultraviolet laser beam is not applied to the substrate 12. In addition, two reference lines 12a and 12b perpendicular to each other are drawn on the surface of the substrate 12.

The stand 13 is always positioned so as to allow the major surface of the substrate 12 carried on the stand to be perpendicular to an optical axis 15 of the ultraviolet laser beam. Further, the stand 13 can be freely moved close to or away from the laser beam radiation system 11, so that distance Lx between a laser beam radiating portion 11a of the system 11 and the substrate 12 is changeable.

Since the optical characteristic adjusting apparatus is used so as to adjust a deviation of the optical axis 15 and a focal distance of the ultraviolet laser beam emitted from the laser beam radiation system 11, the laser beam radiation system itself or an adjusting appliance (not shown) disposed near the operator is appropriately adjusted by the operator, so that each adjustment can be attained.

In the above-constructed optical characteristic adjusting apparatus, when the ultraviolet laser beam emitted from the laser beam radiation system is projected onto the substrate 12, a bright spot 16, having a diameter according to the distance from the radiation system 11 to the substrate 12, is formed because luminescent material mixed in the substrate generates the visible radiation owing to the irradiation of the ultraviolet laser beam. Therefore, it is possible for the operator to observe the bright spot 16 from both the irradiated side of the substrate and the opposite side thereof, so that the above-noted adjustment of the appliance and radiation system 11 can be attained through the observation of the bright spot from the both sides of the substrate.

Additionally, in the above construction, the focal distance of the ultraviolet laser beam can be immediately acknowledged by the fact that the distance Lx between the radiating portion 11a of the radiation system 11 and the substrate 12 is measured when the stand 13 is moved with the focal point of the ultraviolet laser being located on the substrate 12.

In another embodiment of the optical characteristic adjusting apparatus according to the present invention, scales may be provided on the reference lines 12a and 12b drawn on the surface of the substrate 12 so that the deviation of the optical axis 15 can be immediately measured.

In these embodiments of the present invention, for example, (1) piperidium tetra(benzoyltrifluoroacetone)europium complex or (2) 3,9-perylene dicarboxylic acid diphenylthioester is given as the luminescent material which is mixedly formed into the transparent substrate and which generates the visible radiation in response to the ultraviolet laser beam.

(1) piperidium tetra(benzoyltrifluoroacetone) europium complex:

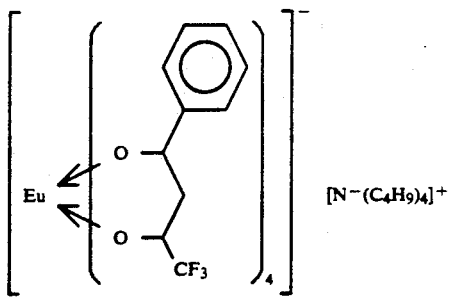

With respect to the foregoing embodiments, the optical characteristic adjusting apparatus for the laser beam radiation system which emits the ultraviolet laser beam has been described. It is, however, noted that by a suitable selection of the luminescent material mixed in the substrate 12, it is possible to attain the adjustment for the laser beam radiation system emitting other non-visible radiation than ultraviolet laser beam.

As has been noted above, in the optical characteristic adjusting apparatus for the laser beam radiation system according to the present invention, the apparatus comprises the transparent substrate mixed with the luminescent material which generates the visible radiation in response to the non-visible radiation, and positioning means for positioning the substrate perpendicular to the optical axis of the laser beam emitted from the laser beam radiation system.

Therefore, since the luminescent material, which generates the visible radiation in response to the non-visible radiation, is mixed in the transparent substrate, the bright spot which is formed by the irradiation of the non-visible radiation on the substrate can be observed from either the irradiated side of the substrate or the opposite side thereof, thus making the broader space where the operator performs the adjustment while observing the optical axis or the like of the non-visible radiation.

What is claimed is:

1. An optical characteristic adjusting apparatus for a laser beam radiation system comprising:

a transparent substrate including therein luminescent material, said luminescent material generating visible radiation in response to non-visible radiation, and means for positioning said transparent substrate perpendicular to an optical axis of a laser beam emitted from the laser beam radiation system so as to enable manual adjustment of optical characteristics of said laser beam.

2. The apparatus according to claim 1, wherein said transparent substrate includes reference lines, said reference lines being drawn perpendicular to each other on a surface of said substrate.

3. The apparatus according to claim 2, further comprising scales for measuring a deviation of the optical axis of the laser beam, said scales being provided on said reference lines.

4. The apparatus according to claim 1, wherein said substrate generates the visible radiation in response to ultraviolet laser beam.

5. The apparatus according to claim 1, wherein said positioning means comprises a stand having a frame for carrying said transparent substrate.

6. The apparatus according to claim 1, wherein said luminescent material is piperidium tetra(benzoyltrifluoroacetone) europium complex.

7. The apparatus according to claim 1, wherein said luminescent material is 3,9-perylene dicarboxylic acid diphenylthioester.

8. An optical characteristic adjusting method for a laser beam radiation system comprising the steps of:

providing a transparent substrate including therein luminescent material, said luminescent material generating visible radiation in response to non-visible radiation;

disposing said transparent substrate perpendicular to an optical axis of a laser beam emitted from the laser beam radiation system; and manually adjusting a positional disposition of said substrate and attendantly an optical characteristic of said laser beam, in response to observing a bright spot of said visible radiation from both sides of said substrate.

* * * * *